J. H. DISSETT.
CLINOMETER.
APPLICATION FILED JUNE 25, 1910.
1,012,993.
Patented Dec. 26, 1911.
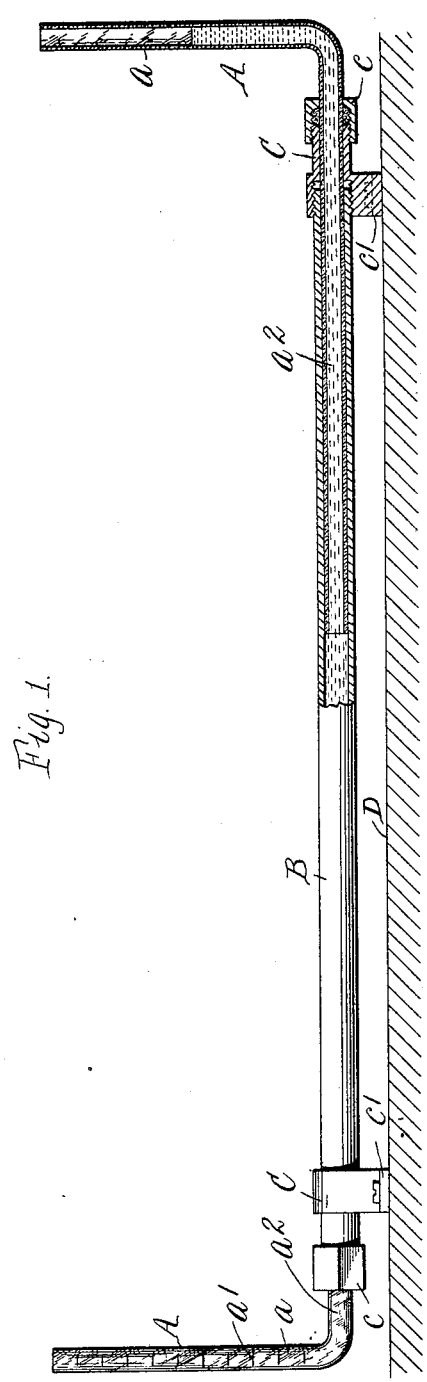
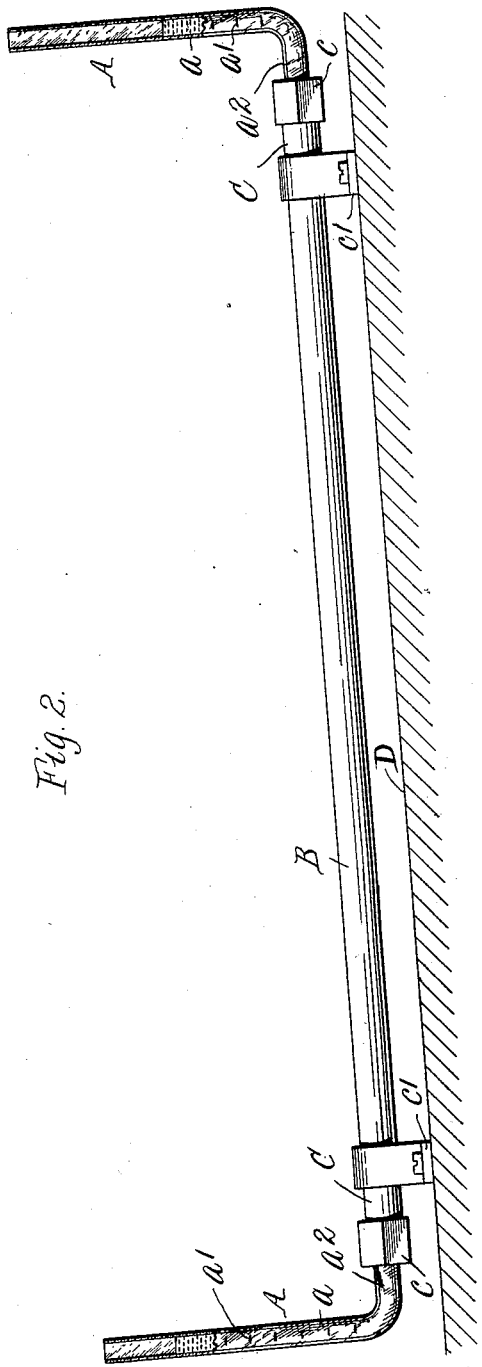
Witnesses.
C. H. Bund.
A. G. Dimond.
Inventor.
John H. Dissett,
By Wilhelm, Parker & Hand,
Attorneys.

UNITED STATES PATENT OFFICE.

JOHN H. DISSETT, OF BUFFALO, NEW YORK.

CLINOMETER.

1,012,993.　　　　　Specification of Letters Patent.　　Patented Dec. 26, 1911.

Application filed June 25, 1910. Serial No. 568,815.

*To all whom it may concern:*

Be it known that I, JOHN H. DISSETT, a citizen of the United States, residing at Buffalo, in the county of Erie and State of New York, have invented a new and useful Improvement in Clinometers, of which the following is a specification.

This invention relates to clinometers or instruments for measuring the difference in level between two points, and the object of the invention is to produce a practical and desirable instrument of simple and compact construction, which may be adjusted with regard to the distance between two points so that the difference in level between these points may be read directly on the instrument.

The clinometer is primarily intended and adapted to be used on shipboard for ascertaining the list or inclination of a vessel, but is not limited to this use.

In the accompanying drawings: Figure 1 is an elevation, partly in section, of a clinometer embodying the invention. Fig. 2 is an elevation showing the instrument in an inclined position.

Like reference characters refer to like parts in both figures.

A A represent two transparent tubes having substantially upright portions partially filled with liquid, which are connected at their lower ends so as to permit the passage of liquid from one to the other and so that the upright portions of the tubes can be adjusted to different distances apart. These tubes, in the construction shown, are L-shaped glass tubes having upright portions $a$ which are provided with suitable scales or graduations $a'$, and lateral portions $a^2$ which are telescopically arranged in a horizontal connecting tube B. This connecting tube is preferably provided at opposite ends with fittings or connections C which form water-tight joints between the tube B and the lateral portions of the adjustable tubes A and permit the adjustment of these tubes toward and from each other, and also form attaching parts for securing the tube B on a base or support D. These fittings, which may be screwed or otherwise secured on the tube B, or made integral therewith, have tubular portions provided at their outer ends with cup-shaped screw rings or nuts $c$ forming stuffing boxes through which the tubes A pass. Any suitable packing is employed in the stuffing boxes which can be compressed tightly around the tubes A by screwing the nuts $c$ onto the fittings C. By these means liquid-tight joints are formed between the adjustable connecting tubes and the tubes A can be adjusted by first loosening the nuts $c$, and then rigidly secured in the adjusted position by tightening up the nuts. The fittings C are provided with suitable lugs or parts $c'$ adapted to be fastened by screws, or otherwise, on the base D. The tubes A can be connected in other ways which will permit the distance between their upright portions to be readily varied and afford a connecting passage for the liquid.

In using the instrument to find the difference in level between two points, it is arranged lengthwise in a position parallel to a line passing through the two points. The two tubes A A are then so adjusted relatively to each other that the distance between them is proportional, in any convenient scale, to the distance between the two points. Since the upper surfaces of the liquid in the upright portions of the two tubes will always be on the same level, the difference in level between these portions of the tubes can be ascertained from the graduations on the upright portions of the tubes, and will be proportional to the difference in level between the two points. By making these graduations to a suitable scale, the difference in level between the points may be read directly from the graduations on the tubes. In the particular use of this device on board ships, the instrument is mounted transversely of the vessel so that it is horizontal when the vessel is in its normal position, *i. e.*, when it does not list toward either side. The tubes A A are then adjusted so that the distance between them corresponds, in a convenient scale proportional to the scales on the upright portions of the tubes, for example, in inches, to the beam of the vessel measured in feet. Then each inch on the tubes will correspond to a foot at the side of the vessel, and the difference in height between the columns of liquid in the upright portions of the tubes, as shown by the graduations on the tubes, will represent the list of the vessel in feet.

The instrument is exceedingly simple in construction and owing to its adjustability, it is direct-reading, thus obviating the necessity for computations.

On vessels the instrument may be mounted in a convenient place and the list of the vessel due to an unequal distribution of the load can be at once determined. These instruments also have the advantage that they can be manufactured in one standard size and can then be adjusted to suit the beam of any vessel.

I claim as my invention:

1. In a clinometer, the combination of two upright tubes provided with graduations and each having a laterally extending arm at its lower end, and a substantially horizontal rigid tubular connection for said upright tubes with which said arms have telescopic engagement to permit said upright tubes to be adjusted laterally toward and from each other and which holds the tubes in their adjusted positions, substantially as set forth.

2. In a clinometer, the combination of two opposite tubes having upright graduated portions and lateral portions, a connecting tube in which the lateral portions of said opposite tubes are adapted to telescope, and fittings which connect said opposite tubes and said connecting tubes and which permit said opposite tubes to be adjusted relatively to each other, said fittings having attaching parts by means of which the instrument may be secured to a base, substantially as set forth.

Witness my hand in the presence of two subscribing witnesses.

JOHN H. DISSETT.

Witnesses:
S. C. HOLDEN,
GEORGE MUNFORD.

---

Copies of this patent may be obtained for five cents each, by addressing the "Commissioner of Patents, Washington, D. C."